(12) United States Patent
Otsuka (10) Patent No.: US 7,898,445 B2
(45) Date of Patent: Mar. 1, 2011

(54) ENTROPY CODING APPARATUS

(75) Inventor: Katsumi Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 12/376,335

(22) PCT Filed: Oct. 17, 2007

(86) PCT No.: PCT/JP2007/070680
§ 371 (c)(1),
(2), (4) Date: Feb. 4, 2009

(87) PCT Pub. No.: WO2008/053755
PCT Pub. Date: May 8, 2008

(65) Prior Publication Data
US 2010/0259427 A1     Oct. 14, 2010

(30) Foreign Application Priority Data
Oct. 31, 2006 (JP) ............................. 2006-296500

(51) Int. Cl.
*H03M 7/00* (2006.01)
(52) U.S. Cl. ............................ 341/107; 341/50; 341/51
(58) Field of Classification Search .................. 341/50, 341/51, 106, 107
See application file for complete search history.

(56) References Cited

U.S. PATENT DOCUMENTS

| | | | |
|---|---|---|---|
| 6,603,413 B2 | 8/2003 | Igarashi et al. | 341/67 |
| 6,894,628 B2 * | 5/2005 | Marpe et al. | 341/107 |
| 6,937,170 B2 | 8/2005 | Otsuka | 341/67 |
| 6,947,602 B2 | 9/2005 | Igarashi et al. | 382/235 |
| 6,993,202 B2 | 1/2006 | Igarashi et al. | 382/246 |
| 7,218,677 B2 | 5/2007 | Otsuka | 375/253 |
| 7,218,788 B2 | 5/2007 | Igarashi et al. | 382/239 |
| 7,224,844 B2 | 5/2007 | Otsuka | 382/239 |
| 7,375,661 B2 | 5/2008 | Chiba et al. | 341/67 |
| 2005/0088324 A1 | 4/2005 | Fuchigami et al. | 341/107 |
| 2005/0179572 A1 * | 8/2005 | Winger | 341/107 |
| 2006/0158355 A1 * | 7/2006 | Jeon et al. | 341/50 |

FOREIGN PATENT DOCUMENTS

| | | |
|---|---|---|
| JP | 11-103257 | 4/1999 |
| JP | 11-103257 A | 4/1999 |
| JP | 2005-130099 A | 5/2005 |

OTHER PUBLICATIONS

D. Marpe et al., "Video Compression Using Context-Based Adaptive Arithmetic Coding," Proceedings 2001 International Conference on Image Processing, Thessaloniki, Greece, ICIP 2001, vol. 3, Oct. 7, 2001, pp. 558-561.

D. Marpe et al., "Context-Based Adaptive Binary Arithmetic Coding in JVT/H.26L," Proceedings 2002 International Conference on Image Processing, Rochester, New York, ICIP 2002, vol. 2, Sep. 22, 2002, pp. 513-516.

V.H.S. Ha et al., "Real-time MPEG-4 AVC/H.264 CABAC Entropy Coder," International Conference on Consumer Electronics, Las Vegas, Nevada, ICCE 2005, Jan. 8, 2005, pp. 255-256.

R.R. Osorio et al., "A New Architecture for fast Arithmetic Coding in H.264 Advanced Video Coder," Proceedings 8$^{th}$ Euromicro Conference on Digital System Design, Aug. 30, 2005, pp. 298-305.

* cited by examiner

*Primary Examiner*—Jean B Jeanglaude
(74) *Attorney, Agent, or Firm*—Fitzpatrick, Cella, Harper & Scinto (57) ABSTRACT

An entropy coding apparatus configured to categorize each binarized symbol according to a corresponding bit position and a target arithmetic coding mode, and configured to parallelly perform arithmetic coding of a plurality of symbols belonging to an identical category is provided.

4 Claims, 14 Drawing Sheets

| LOCATION OF SYMBOL DATA (binIdx) | CONTEXT INDEX (ctxIdx) | ARITHMETIC CODING MODE | CATEGORY NUMBER |
|---|---|---|---|
| 0 | EQUATION 1 | NORMAL ARITHMETIC CODING | 0 |
| 1 | EQUATION 2 | NORMAL ARITHMETIC CODING | 1 |
| 2 | | NORMAL ARITHMETIC CODING | 1 |
| 3 | ... | ... | 1 |
| 14 | EQUATION 2 | NORMAL ARITHMETIC CODING | 1 |
| 15 | — | BYPASS ARITHMETIC CODING | 2 |
| 16 | — | BYPASS ARITHMETIC CODING | 2 |
| ... | ... | ... | ... |

| In0 | In1 | In2 | CODED-DATA CONCATENATION TARGET | CODING-ENGINE-STATUS-VARIABLE SELECTION TARGET |
|---|---|---|---|---|
| VALID | VALID | VALID | FIRST BYPASS ARITHMETIC CODING UNIT<br>SECOND BYPASS ARITHMETIC CODING UNIT<br>THIRD BYPASS ARITHMETIC CODING UNIT<br>FOURTH BYPASS ARITHMETIC CODING UNIT | FOURTH BYPASS ARITHMETIC CODING UNIT |
| VALID | VALID | INVALID | FIRST BYPASS ARITHMETIC CODING UNIT<br>SECOND BYPASS ARITHMETIC CODING UNIT<br>THIRD BYPASS ARITHMETIC CODING UNIT | THIRD BYPASS ARITHMETIC CODING UNIT |
| VALID | INVALID | INVALID | FIRST BYPASS ARITHMETIC CODING UNIT<br>SECOND BYPASS ARITHMETIC CODING UNIT | SECOND BYPASS ARITHMETIC CODING UNIT |
| INVALID | INVALID | INVALID | FIRST BYPASS ARITHMETIC CODING UNIT | FIRST BYPASS ARITHMETIC CODING UNIT |

| 0 | 18 | 0 | 0 |
|---|---|---|---|
| -2 | 0 | 0 | 0 |
| 0 | 0 | 0 | 0 |
| 0 | 0 | 0 | 0 |

FIG. 14

| coef_abs_level_minus1 | UT | Golomb |
|---|---|---|
| 0 | 0 | |
| 1 | 1 0 | |
| 2 | 1 1 0 | |
| 3 | 1 1 1 0 | |
| 4 | 1 1 1 1 0 | |
| ... | ... | ... |
| 13 | 1 1 1 1 1 1 1 1 1 1 1 1 1 0 | |
| 14 | 1 1 1 1 1 1 1 1 1 1 1 1 1 1 | 0 |
| 15 | 1 1 1 1 1 1 1 1 1 1 1 1 1 1 | 1 0 0 |
| 16 | 1 1 1 1 1 1 1 1 1 1 1 1 1 1 | 1 0 1 |
| 17 | 1 1 1 1 1 1 1 1 1 1 1 1 1 1 | 1 1 0 0 0 |
| ... | ... | ... |

ENTROPY CODING APPARATUS

TECHNICAL FIELD

The present invention relates to entropy coding techniques. More particularly, the present invention relates to an entropy coding technique that employs arithmetic coding processing as entropy coding processing.

BACKGROUND ART

Recently, the JVT (Joint Video Team) has standardized the H.264 (ITU-T (International Telecommunication Union-Telecommunication Standardization Sector) Recommendation H.264|ISO (International Organization for Standardization)/IEC (International Electrotechnical Commission) 14496-10 AVC (Advanced Video Coding)) coding method as a highly efficient video coding method. In H.264, image data is handled as digital data as in the case of JPEG (Joint Photographic Experts Group), which is known as a still image coding method, and of MPEG (Moving Picture Experts Group)-2 or MPEG-4 (version 2) which are known as video coding methods.

Furthermore, particularly in the video coding method, image data is compressed using hybrid coding to reduce redundant information between frames (i.e., in the temporal direction) and redundant information of pixels within a frame (i.e., in the spatial direction) for the purpose of highly efficient information transmission and storage. In the hybrid coding, a technique, referred to as entropy coding, for performing variable-length coding using information deviation is employed together with orthogonal transformation, such as discrete cosine transform, and motion compensation.

Regarding the entropy coding employed in H.264, CAVLC (Context-Based Adaptive Variable Length Coding) that employs Huffman coding and CABAC (Context-Based Adaptive Binary Arithmetic Coding) that employs arithmetic coding are defined according to profile types. More specifically, CAVLC is selected in a baseline profile constituted by less complex coding tools for communication applications. On the other hand, CABAC is selected in main and extended profiles that focus on coding efficiency.

Japanese Patent Laid-Open Nos. 11-103257 and 2005-130099 disclose techniques for realizing CABAC by hardware. In these techniques, generation of addresses to be supplied to a context memory that holds status data and an arithmetic coding operation are performed as pipeline processing, whereby arithmetic coding of symbol data is performed during each clock cycle without delay.

With the recent rapid increase in resolution, which is represented by high-definition images, high-speed coding apparatuses are desired. In the hybrid coding represented by H.264, an increase in the processing speed of, particularly, an entropy coding apparatus is one factor that dictates the processing speed of the entire coding apparatus.

However, a circuit for performing arithmetic coding that is implemented using the techniques disclosed in the above-described Japanese Patent Laid-Open Nos. 11-103257 and 2005-130099 realizes arithmetic coding of only one symbol during one cycle at the maximum. Thus, it is difficult to realize high-speed arithmetic coding processing.

DISCLOSURE OF INVENTION

In view of the above-described problem, the present invention provides an entropy coding apparatus that realizes parallel arithmetic coding of a plurality of symbols during one cycle.

According to an aspect of the present invention, an entropy coding apparatus is provided that includes a binarization unit configured to binarize a value of an input syntax element to generate a symbol data string including at least one symbol, a categorization unit configured to categorize, according to a bit position corresponding to each of the at least one symbol and a target arithmetic coding mode, each of the at least one symbol generated by the binarization unit, a symbol selecting unit configured to select at least one symbol belonging to an identical category among the symbols input from the categorization unit and output the at least one selected symbol and configured to specify an arithmetic coding mode to be applied to the selected symbol, and an arithmetic coding section configured to parallelly perform arithmetic coding of the at least one symbol, selected by the symbol selecting unit and belonging to the identical category, using the arithmetic coding mode specified by the symbol selecting unit.

The present invention allows arithmetic coding of a plurality of symbols to be performed parallelly during one cycle by categorizing each of binarized symbols according to a corresponding bit position and a target arithmetic coding mode and by parallelly performing arithmetic coding of a plurality of symbols belonging to an identical category. This permits high-speed arithmetic coding processing to be performed when compared to the processing speed of entropy coding apparatuses in the related art.

Further features of the present invention will become apparent from the following description of exemplary embodiments with reference to the attached drawings.

BEST MODE FOR CARRYING OUT THE INVENTION

Exemplary embodiments of the present invention will now be described in detail in accordance with the accompanying drawings.

First Exemplary Embodiment

Figure 1:
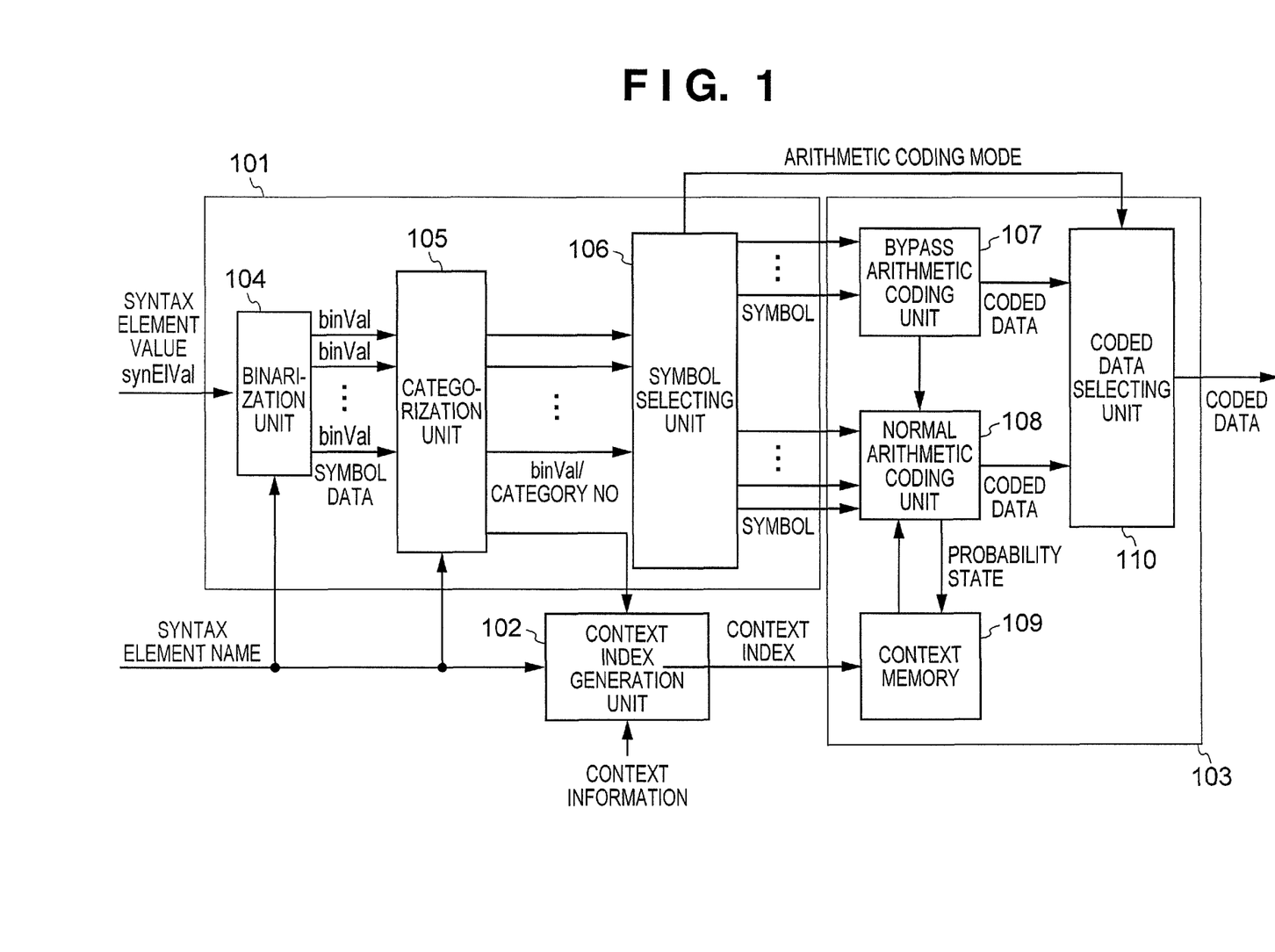
FIG. 1 is a block diagram of an entropy coding apparatus according to a first exemplary embodiment of the present invention.

FIG. 1 is a block diagram of an entropy coding apparatus according to a first exemplary embodiment of the present invention that employs CABAC (Context-Based Adaptive Binary Arithmetic Coding), which is one of entropy coding methods of H.264 coding method.

Two arithmetic coding modes are defined for CABAC in the recommendation of H.264 (ITU-T (International Telecommunication Union-Telecommunication Standardization Sector) Recommendation H.264|ISO (International Organization for Standardization)/IEC (International Electrotechnical Commission) 14496-10 AVC (Advanced Video Coding)).

Figure 2:
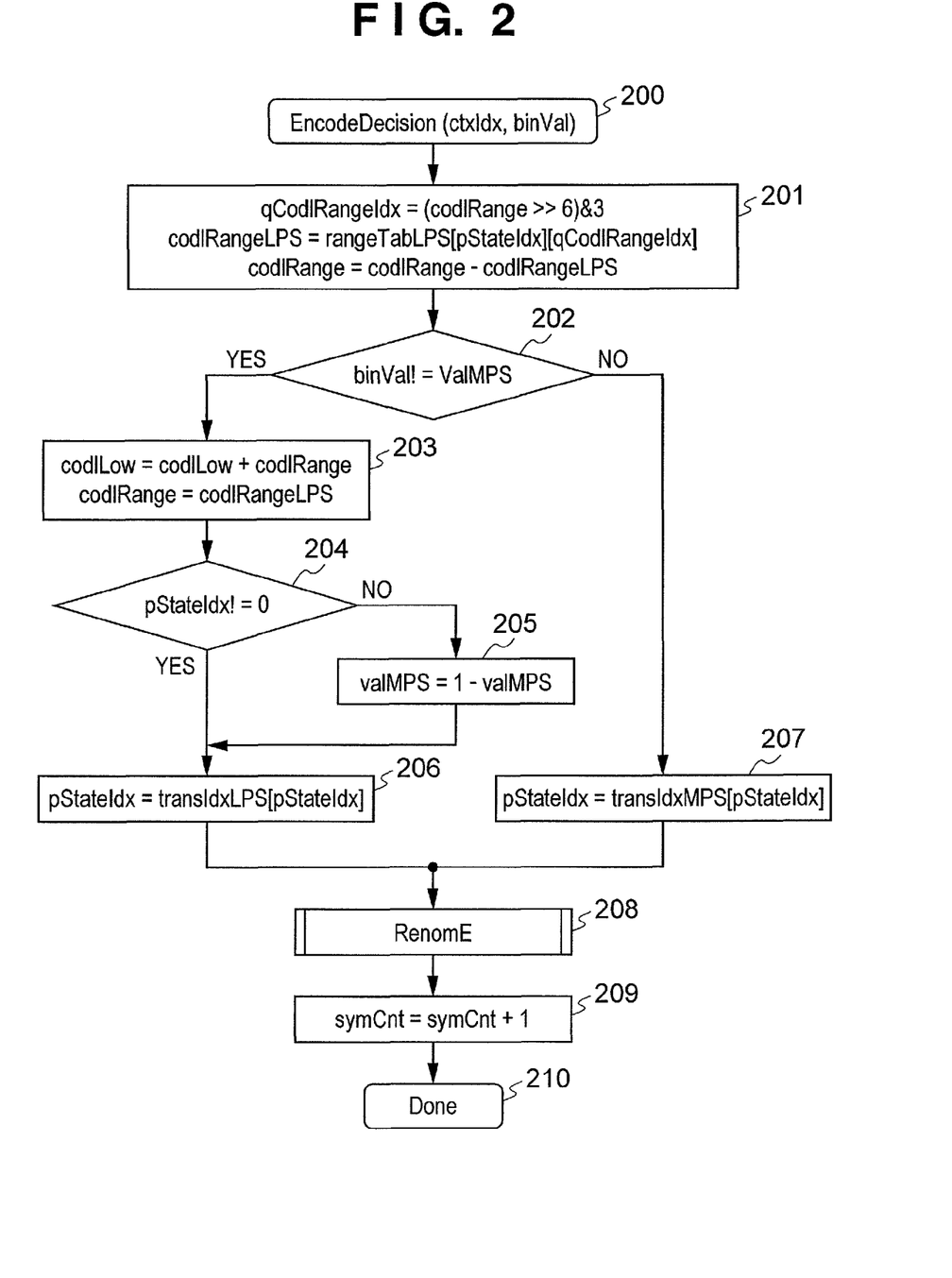
FIG. 2 is a flowchart of a function EncodeDecision( ) in CABAC processing according to an exemplary embodiment of the present invention.
Figure 3:
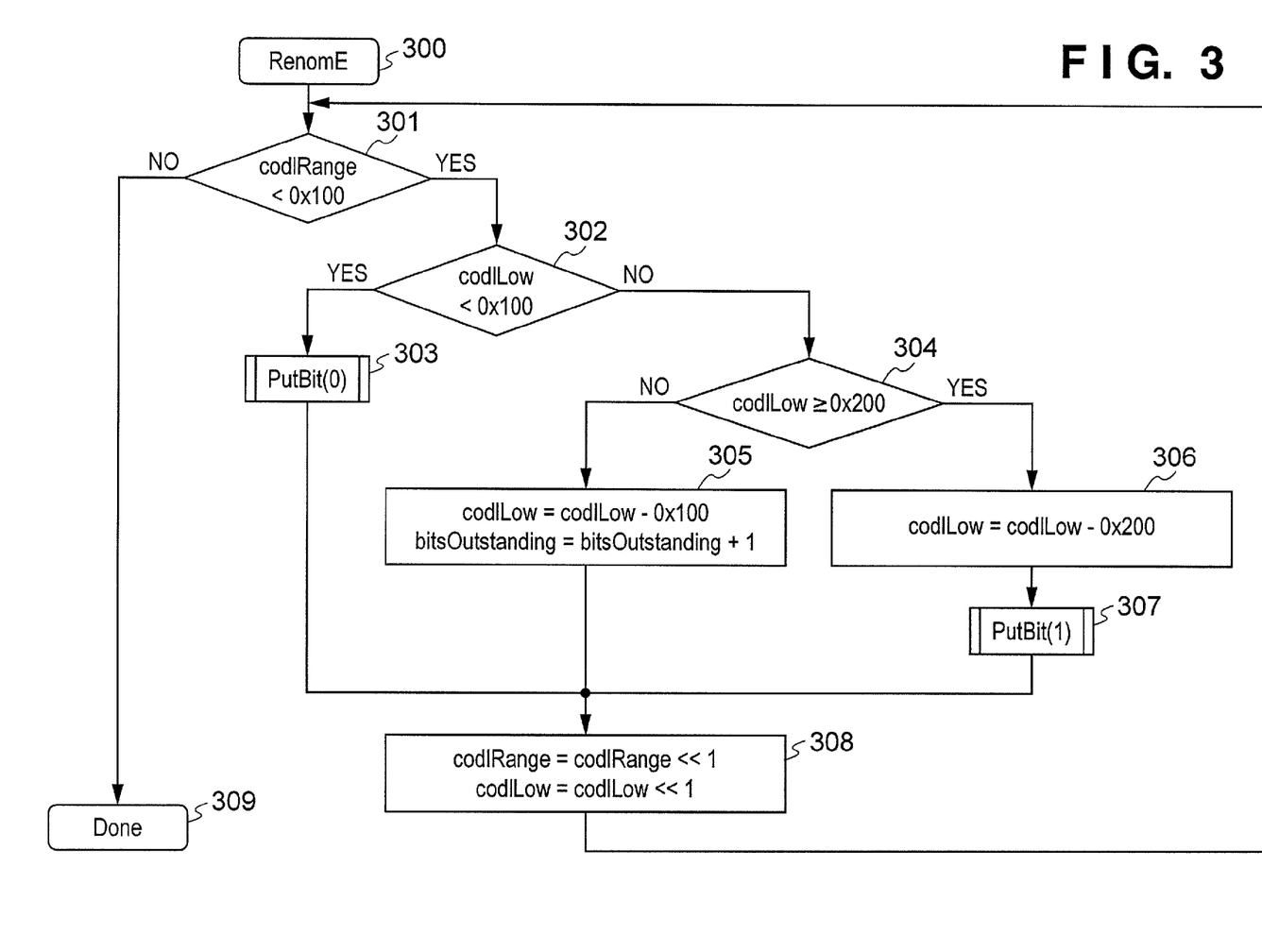
FIG. 3 is a flowchart of a function RemormE( ) in CABAC processing according to an exemplary embodiment of the present invention.
Figure 4:
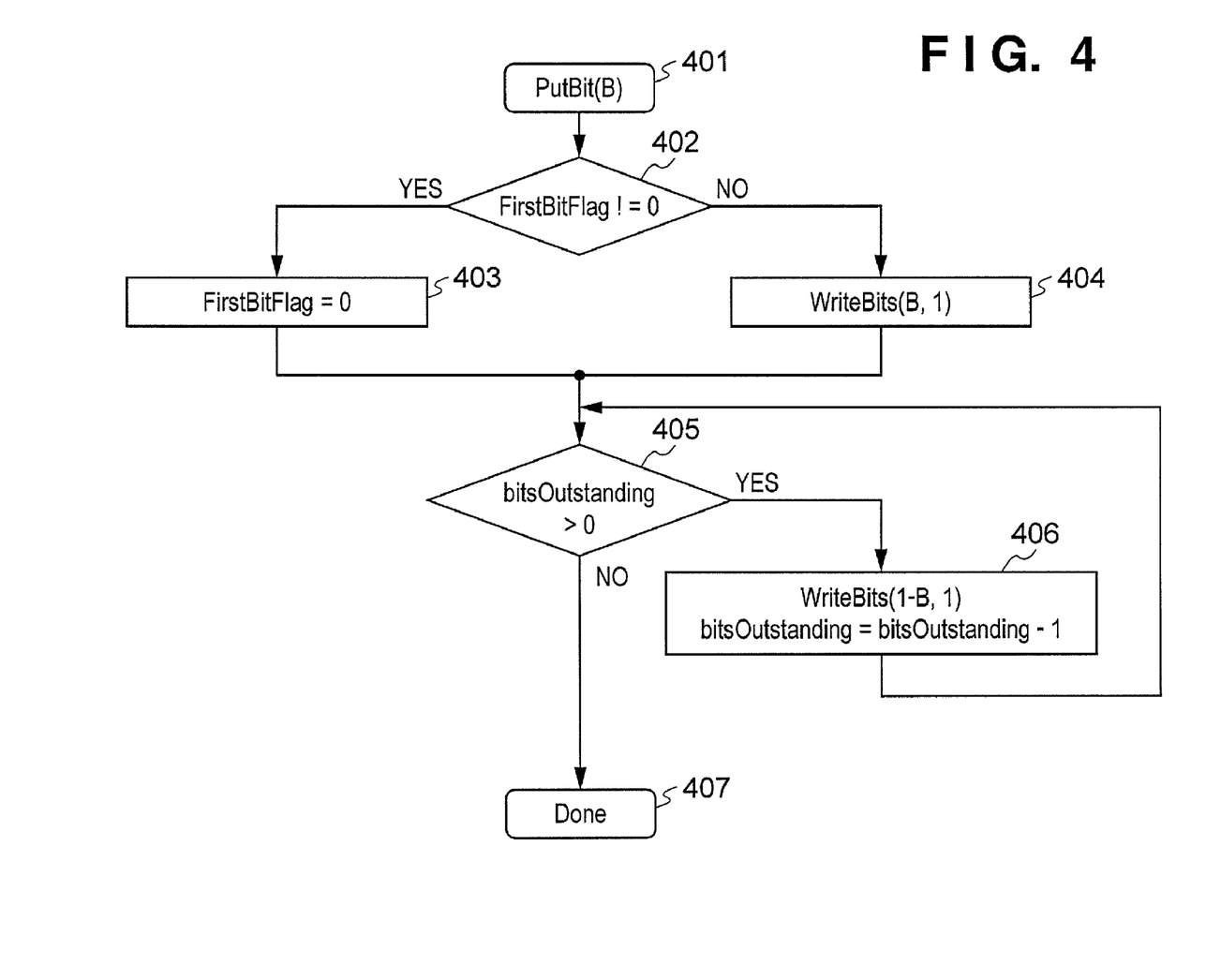
FIG. 4 is a flowchart of a function PutBit( ) in CABAC processing according to an exemplary embodiment of the present invention.
Figure 5:
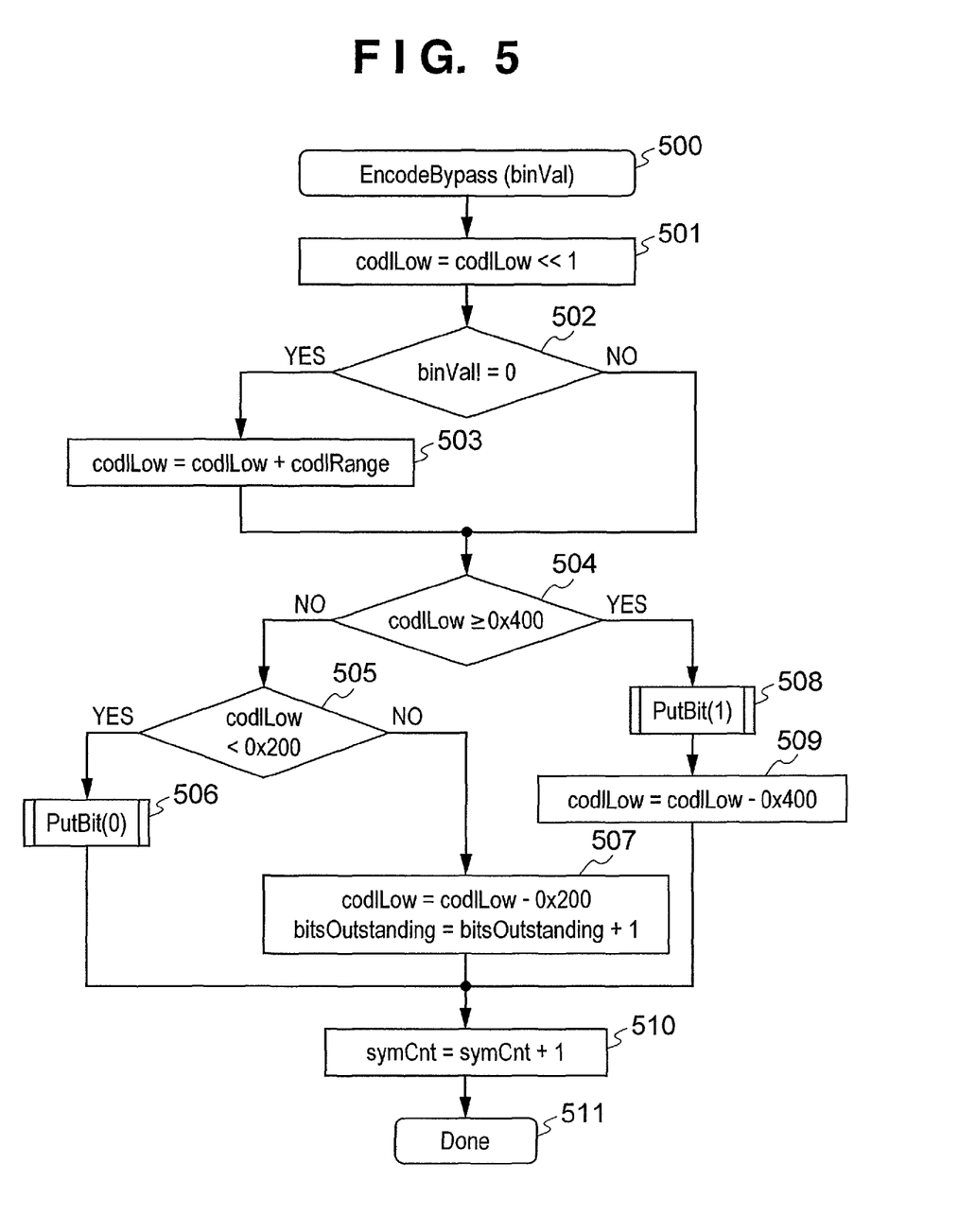
FIG. 5 is a flowchart of a function EncodeBypass( ) in CABAC processing according to an exemplary embodiment of the present invention.

One is an arithmetic coding mode for arithmetic coding processing defined as a function EncodeDecision( ) shown in FIGS. 2 to 4 that employs status variables of an arithmetic coding engine and context variables uniquely selected in accordance with a context index. The other is an arithmetic coding mode for bypass coding processing defined as a function EncodeBypass( ) shown in FIG. 5 that employs the status variables of the arithmetic coding engine.

In this exemplary embodiment, for ease of explanation, the arithmetic coding processing corresponding to the function EncodeDecision( ) is referred as normal arithmetic coding, whereas the bypass coding processing corresponding to the function EncodeBypass( ) is referred as bypass arithmetic coding.

An exemplary configuration of an entropy coding apparatus shown in FIG. 1 will be described next. Values of all syntax elements (hereinafter, referred to as "SE") that are specified to be coded using CABAC in the H.264 recommendation are input to the entropy coding apparatus as data. The input syntax element (SE) value synElVal is supplied to a binarization unit 104 of a binarization section 101. The binarization unit 104 binarizes the supplied syntax element (SE) value synElVal to generate a symbol data string including at least one symbol (also referred to as "symbol data").

Figure 6:
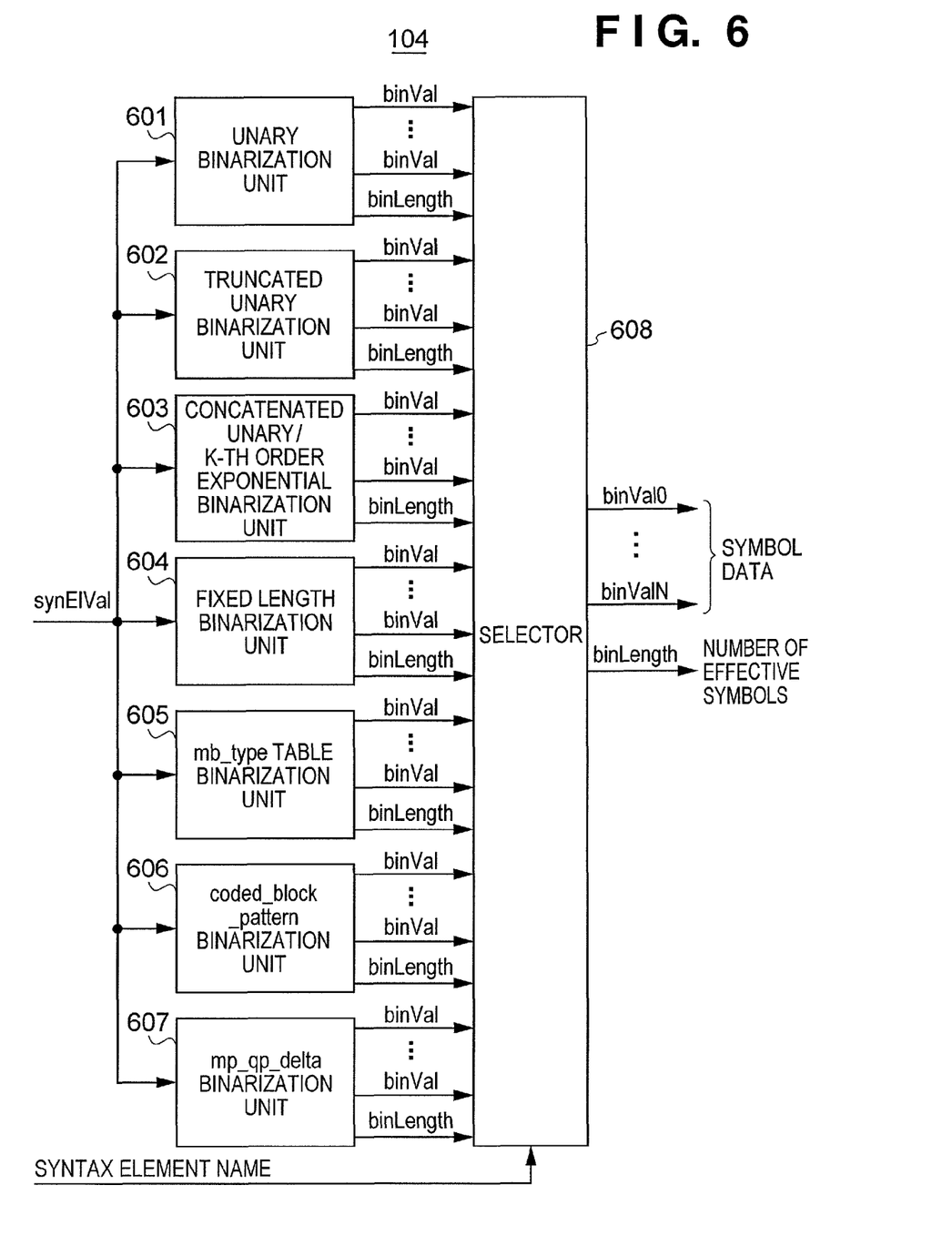
FIG. 6 is a block diagram illustrating an internal configuration of a binarization unit according to an exemplary embodiment of the present invention.

FIG. 6 is a block diagram showing an exemplary internal configuration of the binarization unit 104. As shown in FIG. 6, the binarization unit 104 includes seven parallel-arranged binarization units 601 to 607 that are defined in the H.264 recommendation. A selector 608 selects one of outputs from the seven binarization units according to the type of the SE, and outputs binary data bit values binVal (hereinafter, each referred to as "symbol" or "symbol data"), namely, a binarization result, and the number of effective symbols.

Referring back to FIG. 1, a categorization unit 105 categorizes each symbol, which is generated by the binarization unit 104 and input thereto in parallel, according to the type of the SE, a bit position binIdx of the symbol (hereinafter, also referred to as a symbol data position representing value binIdx), a context index ctxIdx, and the arithmetic coding mode. The categorization unit 105 categorizes symbols having an identical context index ctxIdx and an identical assigned arithmetic coding mode, which are used by an arithmetic coding section 103, into an identical category. The categorization unit 105 determines the context index ctxIdx and the arithmetic coding mode on the basis of the type of the SE of each symbol and the bit position binIdx of the symbol using a method described later, and outputs a category number corresponding to each symbol.

Figure 7:
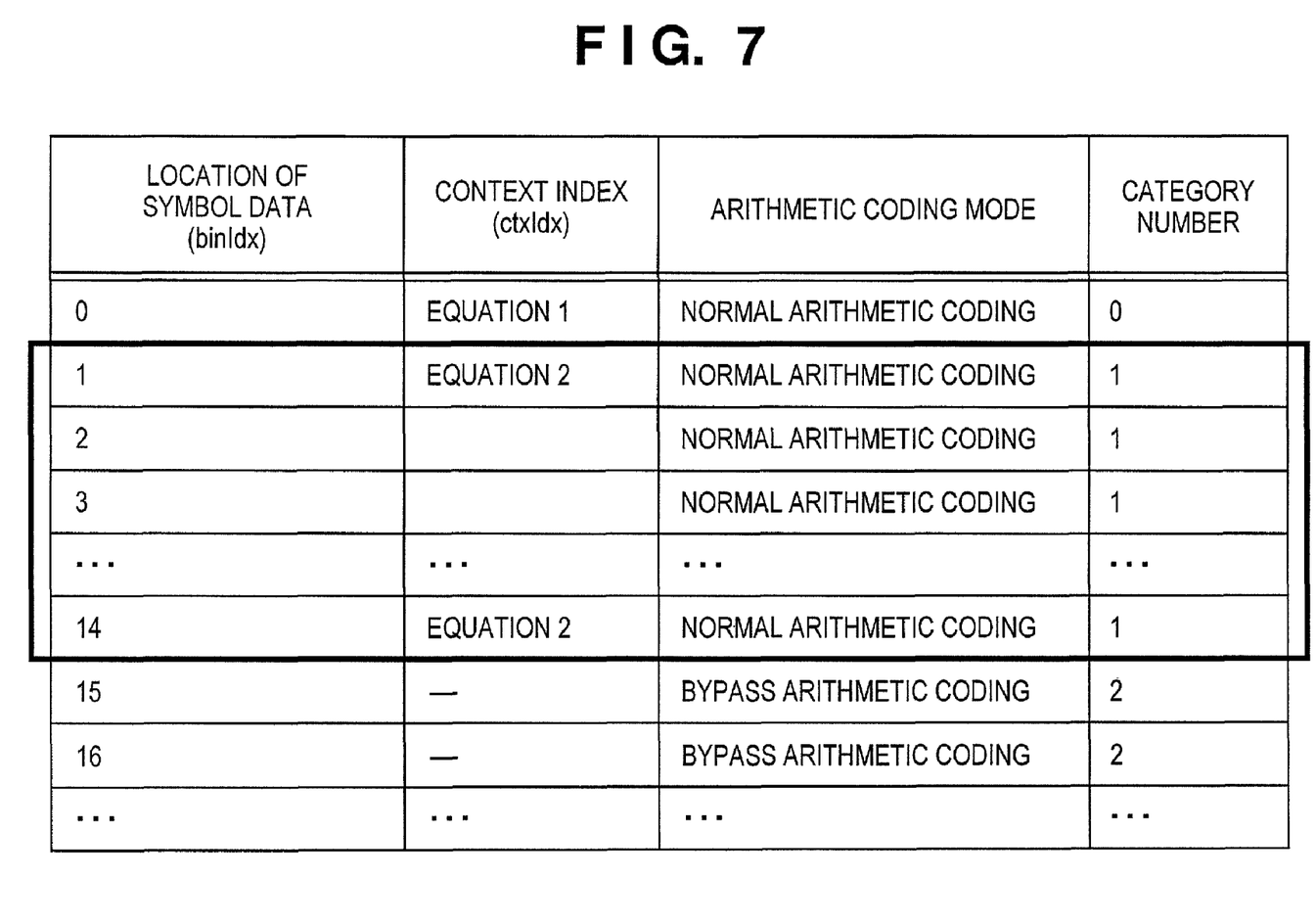
FIG. 7 is a schematic diagram showing a categorization method employed in a categorization unit according to an exemplary embodiment of the present invention.

FIG. 7 is a schematic diagram showing a categorization method employed in the categorization unit 105 in a case where the type of a syntax element (SE) is coeff_abs_level_minus1. Referring to FIG. 7, the symbol data position representing value binIdx varies from 0 to a value obtained by subtracting 1 from the number of effective symbols supplied from the selector 608 of the binarization unit 104. The context index ctxIdx corresponding to each symbol can be determined using the following equations.

[In the case of the symbol data position representing value is equal to 0 (binIdx==0)]ctxIdxInc= ((numDecodAbsLevelGt1!=0)?:0:Min(4,1+num-DecodAbsLevelEq 1))    (Equation 1)

[In the case of the symbol data position representing value is not equal to 0 (binIdx!=0)]ctxIdxInc=5+ Min(4,numDecodAbsLevelGt1)    (Equation 2)

Here, a value numDecodAbsLevelGt1 represents a cumulative number of transform coefficients, in the transform coefficient block currently undergoing the coding processing, having a level whose absolute value is greater than 1. A value numDecdAbsLevelEq1 represents a cumulative number of transform coefficients having a level whose absolute value is equal to 1.

A value obtained by further adding 227 to the value ctxIdxInc resulting from Equations 1 and 2 corresponds to the context index ctxIdx, according to which as well as Equations 1 and 2, it is obvious that values of context index ctxIdx differ from one another.

Accordingly, categories differ between a symbol having the symbol data position representing value binIdx equal to 0 and other symbols. Now, suppose that a category number 0 is assigned to a symbol having the symbol data position representing value binIdx equal to 0.

The arithmetic coding modes corresponding to symbols will be discussed next. In cases where the symbol data position representing value binIdx is not greater than 14, which are indicated by a thick frame in FIG. 7, the normal arithmetic coding mode is selected. On the other hand, in cases where the symbol data position representing value binIdx is not less than 15, the bypass arithmetic coding mode is selected. Accordingly, the categorization unit 105 categorizes symbols having the symbol data position representing value binIdx that is between 1 and 14 into an identical category, and assigns a category number of 1 to the category. The categorization unit 105 also categorizes all symbols having the symbol data position representing value binIdx that is not less than 15 into another identical category, and assigns a category number of 2 to the category.

As described above, the categorization unit 105 assigns the category number to all of the symbols, and outputs the category number and the symbol data to a symbol selecting unit

106 shown in FIG. 1. The categorization unit 105 also supplies the result of categorization to a context index generation unit 102.

The symbol selecting unit 106 will be described next. The symbol selecting unit 106 parallelly supplies the arithmetic coding section 103 a plurality of symbols belonging to the identical category on the basis of the input symbols and the category number of the category including the symbols. The symbol selecting unit 106 also supplies the arithmetic coding section 103 an arithmetic coding mode corresponding to each symbol. More specifically, the symbol selecting unit 106 outputs at least one symbol belonging to the identical category selected from the symbols supplied thereto from the categorization unit 105, and also specifies the arithmetic coding mode to be applied to the symbol. However, the maximum number of symbols to be output at the same time depends on the number of symbols processable by a normal arithmetic coding unit 108 and a bypass arithmetic coding unit 107 of the arithmetic coding section 103 in parallel. The number of symbols processable in parallel is uniquely decided at the time of implementation. In this exemplary embodiment, it is assumed that the normal arithmetic coding unit (corresponding to a first arithmetic coding unit) 108 and the bypass arithmetic coding unit (corresponding to a second arithmetic coding unit) 107 can perform arithmetic coding of a maximum of two symbols and of a maximum of four symbols at the same time, respectively.

The arithmetic coding section (corresponding to an arithmetic coding unit) 103 parallelly performs arithmetic coding of symbols, selected by the symbol selecting unit 106 and belonging to the identical category, using the arithmetic coding mode specified by the symbol selecting unit 106. In addition, the arithmetic coding section 103 performs CABAC as the arithmetic coding.

The normal arithmetic coding unit 108 and the bypass arithmetic coding unit 107 included in the arithmetic coding section 103 will be described next.

Figure 8:
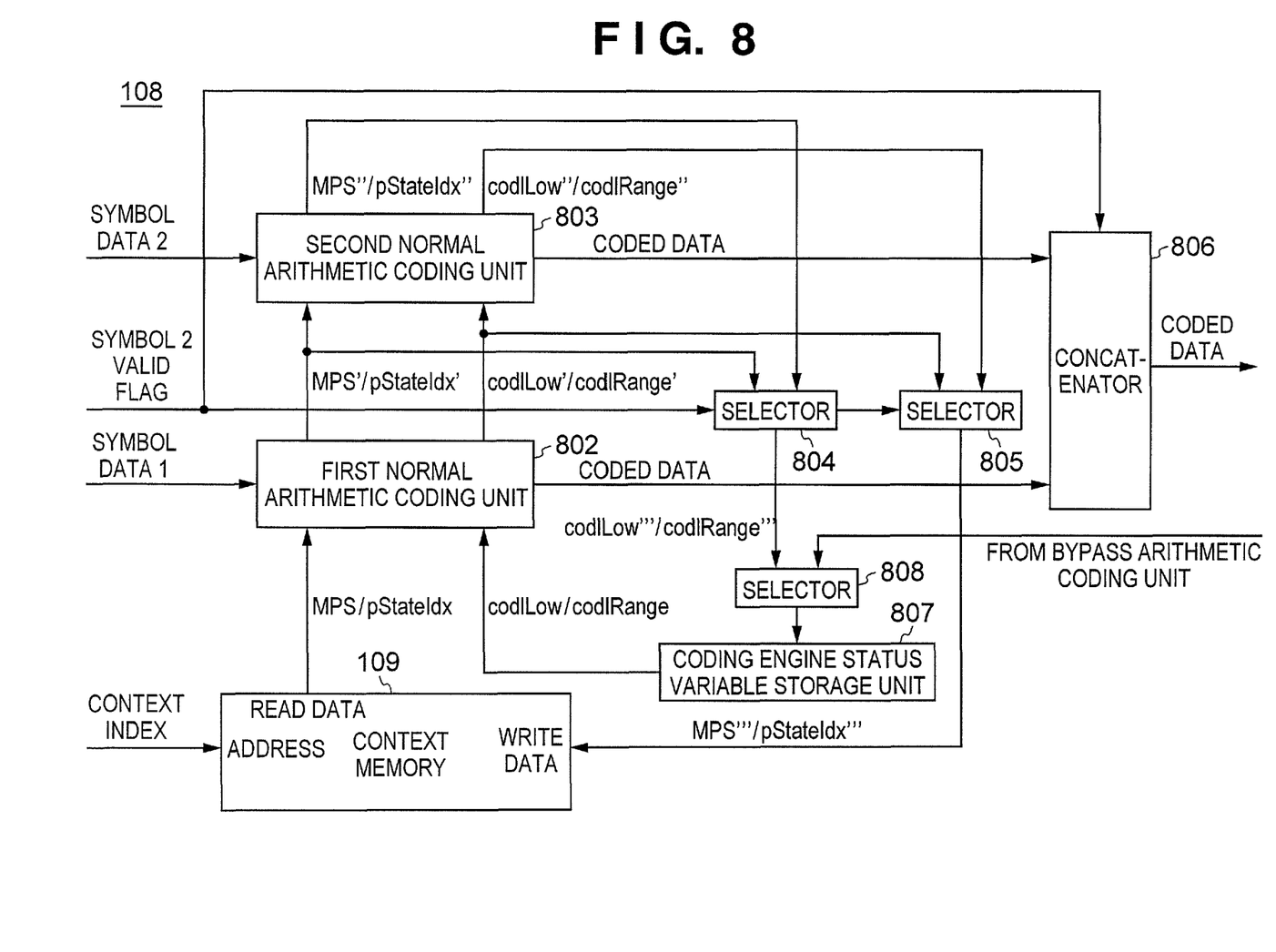
FIG. 8 is a block diagram showing an internal configuration of a normal arithmetic coding unit according to an exemplary embodiment of the present invention.

Firstly, the normal arithmetic coding unit 108 will be described. FIG. 8 is a block diagram showing an exemplary internal configuration of the normal arithmetic coding unit 108. Symbol data 1 and symbol data 2 are parallelly supplied to a first normal arithmetic coding unit 802 and a second normal arithmetic coding unit 803 from the symbol selecting unit 106, respectively. A context memory 109 holds most probable symbol values MPS and probability status variables (pStateIdx) for a context model, which are context variables corresponding to all of the context indices. The normal arithmetic coding unit 108 performs arithmetic coding processing using the context model representing the probability state.

The context variables, specified and output using a context index as an address, are input to the first normal arithmetic coding unit 802. Furthermore, coding engine status variables codlLow and codlRange stored in a coding engine status variable storage unit 807 are also input to the first normal arithmetic coding unit 802.

The first normal arithmetic coding unit 802 performs processing shown in FIGS. 2 to 4 on the input symbol data 1 using the context variables and the coding engine status variables. The first normal arithmetic coding unit 802 then outputs the newly updated coding engine status variables codlLow' and codlRange' as well as the context variables MPS' and pStateIdx' to the second normal arithmetic coding unit 803. The first normal arithmetic coding unit 802 also outputs the coded data, i.e., the result of the arithmetic coding, at the same time.

On the other hand, the second normal arithmetic coding unit 803 performs processing shown in FIGS. 2 to 4 on the input symbol data 2 as in the case of the first normal arithmetic coding unit 802. The second normal arithmetic coding unit 803 then outputs the updated coding engine status variables codlLow" and codlRange" as well as the context variables MPS" and pStateIdx".

Selectors 804 and 805 select either the coding engine status variables and the context variables output from the first normal arithmetic coding unit 802 or the coding engine status variables and the context variables output from the second normal arithmetic coding unit 803. More specifically, a symbol 2 valid flag indicates whether or not the symbol data 2 is valid. When the symbol 2 valid flag indicates that the symbol data 2 is valid, the outputs from the second normal arithmetic coding unit 803 are selected. On the other hand, when the symbol 2 valid flag indicates that the symbol data 2 is invalid, the outputs from the first normal arithmetic coding unit 802 are selected.

The selected context variables are then written back in the context memory 109, whereas the selected coding engine status variables are written back in the coding engine status variable storage unit 807. The coded data output from each of the first normal arithmetic coding unit 802 and the second normal arithmetic coding unit 803 is input to a concatenator 806. When the symbol 2 valid flag indicates that the symbol data 2 is valid, the concatenator 806 concatenates two pieces of coded data, and outputs the concatenated coded data. On the other hand, when the symbol 2 valid flag indicates that the symbol data 2 is invalid, the concatenator 806 outputs only the coded data from the first normal arithmetic coding unit 802.

Figure 9:
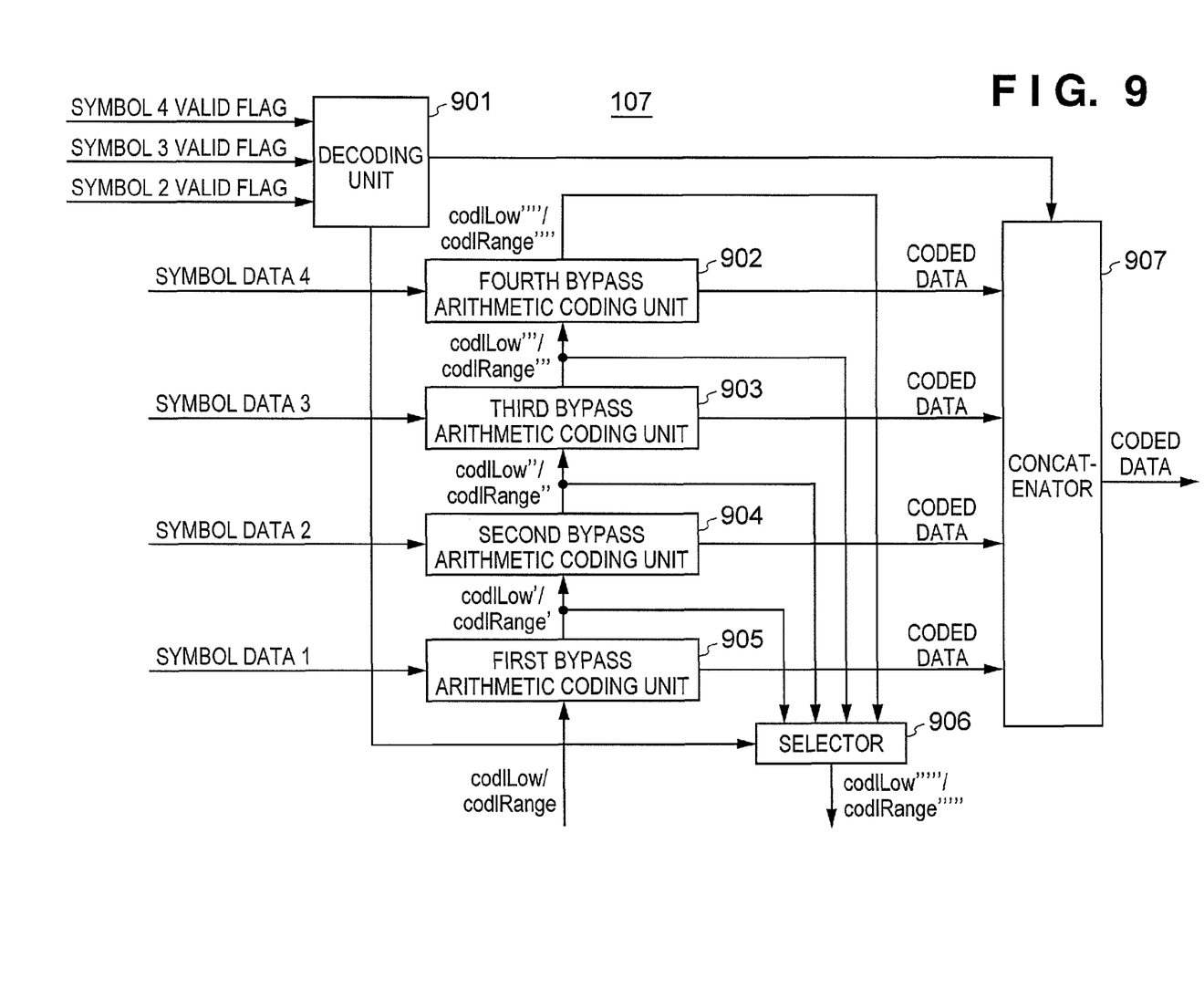
FIG. 9 is a block diagram showing an internal configuration of a bypass arithmetic coding unit according to an exemplary embodiment of the present invention.

The bypass arithmetic coding unit 107 will be described next. FIG. 9 is a block diagram showing an exemplary internal configuration of the bypass arithmetic coding unit 107. The bypass arithmetic coding unit 107 includes four bypass arithmetic coding units, namely, first to fourth bypass arithmetic coding units 902 to 905. Each of the first to fourth bypass arithmetic coding units 902 to 905 is parallelly supplied with a symbol, and performs bypass coding processing shown in FIG. 5. The bypass arithmetic coding unit 107 performs arithmetic coding processing without using the context model representing the probability state. As shown in FIG. 9, in the bypass coding processing, the coding engine status variables are input and newly updated coding engine status variables and coded data are output.

The bypass arithmetic coding unit 107 further includes a decoding unit 901, a selector 906, and a concatenator 907.

Figure 10:
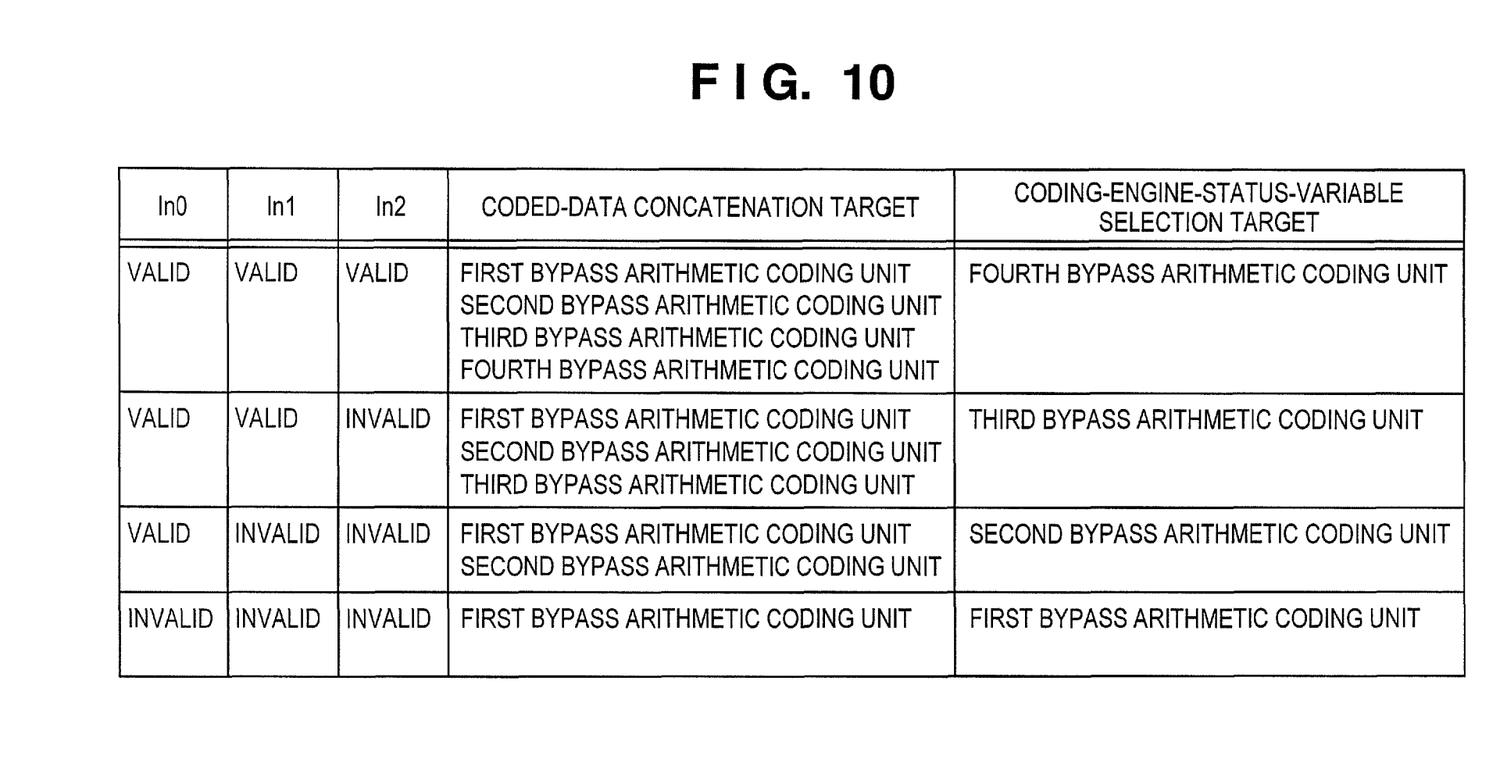
FIG. 10 is a schematic diagram showing a decoding method performed by a decoding unit according to an exemplary embodiment of the present invention.

The decoding unit 901 is supplied with a symbol 2 valid flag, a symbol 3 valid flag, and a symbol 4 valid flag for indicating whether or not symbol data 2, 3, and 4 are valid, respectively. The decoding unit 901 performs decoding processing shown in FIG. 10, and outputs the decoding result to the concatenator 907 and the selector 906. Items In0, In1, and In2 shown in FIG. 10 indicate the symbol 2 valid flag, the symbol 3 valid flag, and the symbol 4 valid flag, respectively.

The updated coding engine status variables codlLow'''' and codlRange'''', namely, outputs of the selector 906, are input to a selector 808 included in the normal arithmetic coding unit 108 shown in FIG. 8. The selector 808 selects the input updated coding engine status variables according to the current arithmetic coding mode. The selected coding engine status variables are written back in the coding engine status variable storage unit 807.

A coded data selecting unit 110 shown in FIG. 1 selects one of the coded data supplied from the normal arithmetic coding unit 108 and the coded data supplied from the bypass arithmetic coding unit 107 according to the arithmetic coding mode, and outputs the selected coded data as the output coded data of the entropy coding apparatus.

The context index generation unit 102 shown in FIG. 1 generates a context index, namely, an address to be supplied to the context memory 109, corresponding to a symbol output from the symbol selecting unit 106 according to the type of the syntax element and the result of the categorization performed by the categorization unit 105. Context index generating methods employed in the context index generation unit 102 are disclosed in detail according to the types of the syntax element (SE) in the H.264 recommendation, thus the description thereof is omitted herein.

Figure 11:
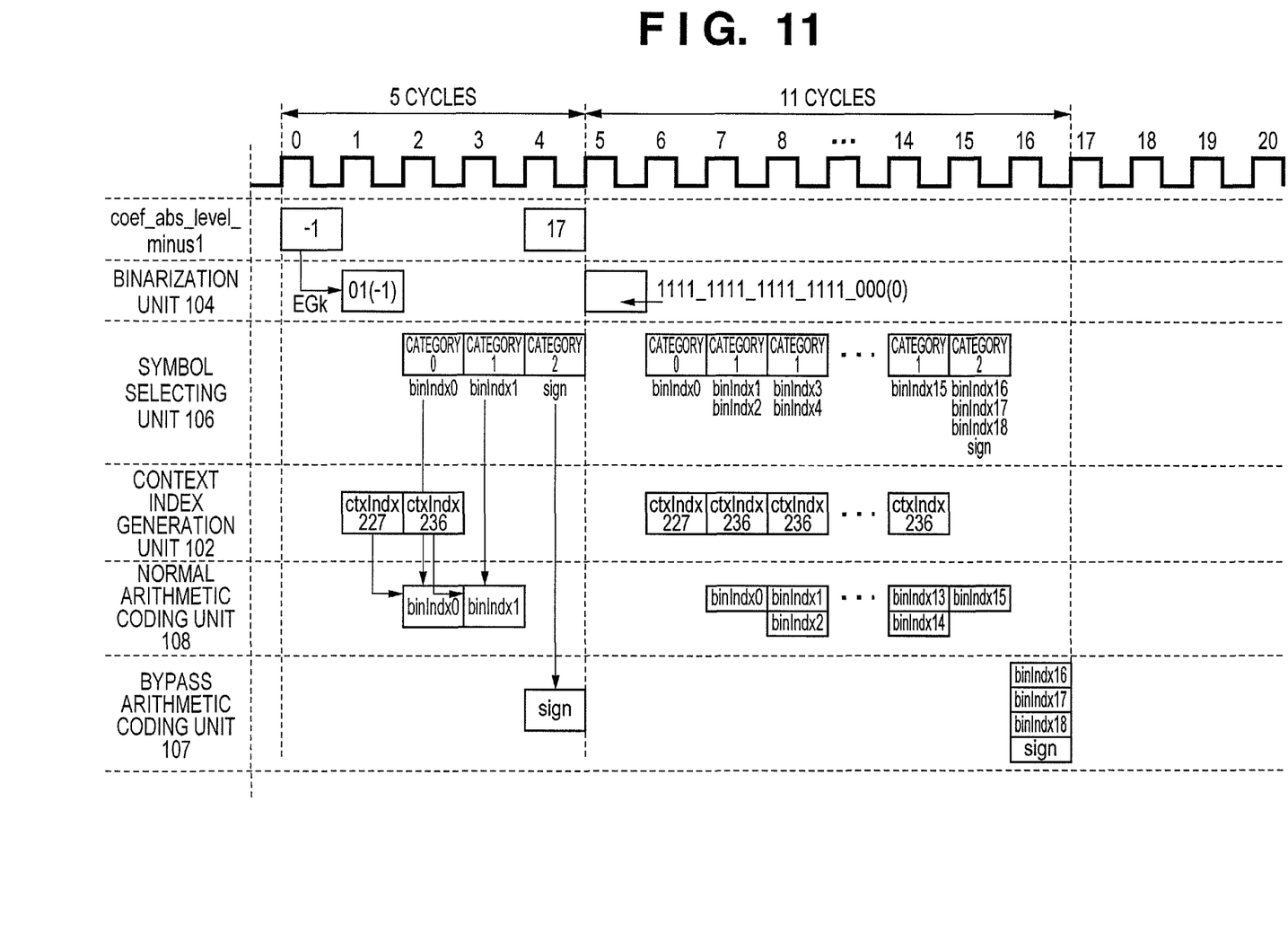
FIG. 11 is a timing chart of operations performed by an entropy coding apparatus according to a first exemplary embodiment of the present invention.
Figure 12:
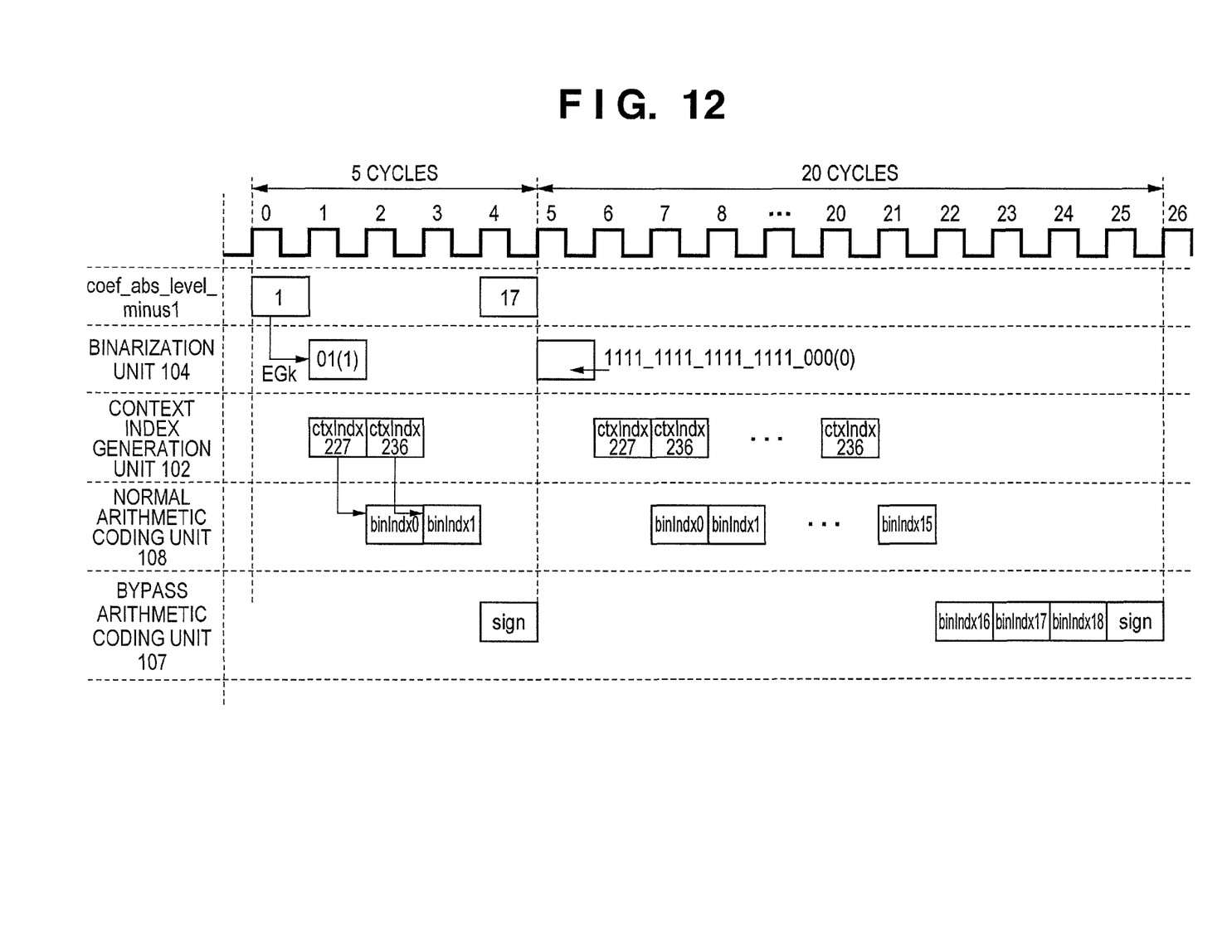
FIG. 12 is a timing chart of operations performed by an entropy coding apparatus according to the related art.

A flow of operations performed by the entropy coding apparatus shown in FIG. 1 will be described next. FIG. 11 shows a timing chart of operations performed by the entropy coding apparatus according to the first exemplary embodiment of the present invention, whereas FIG. 12 shows a timing chart of operations performed by an entropy coding apparatus according to the related art, for plainly illustrating advantages provided by the exemplary embodiment of the present invention.

Figure 13:
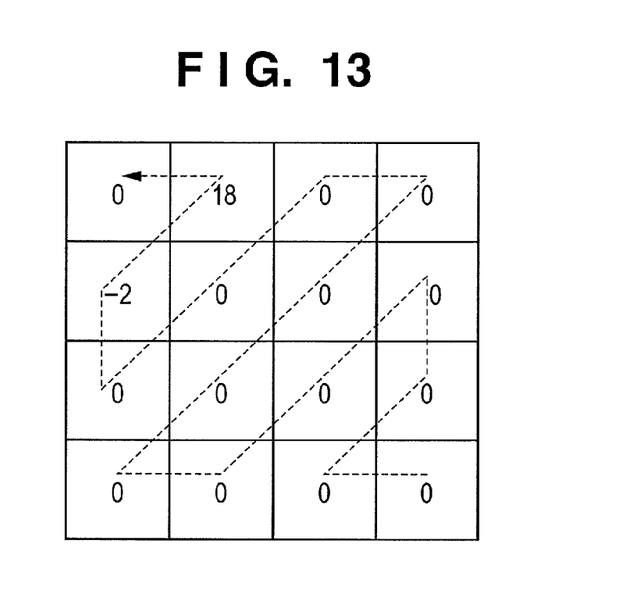
FIG. 13 is a diagram showing distribution of transform coefficient values in a 4×4 block that are input to an entropy coding apparatus according to a first exemplary embodiment of the present invention.
Figure 14:
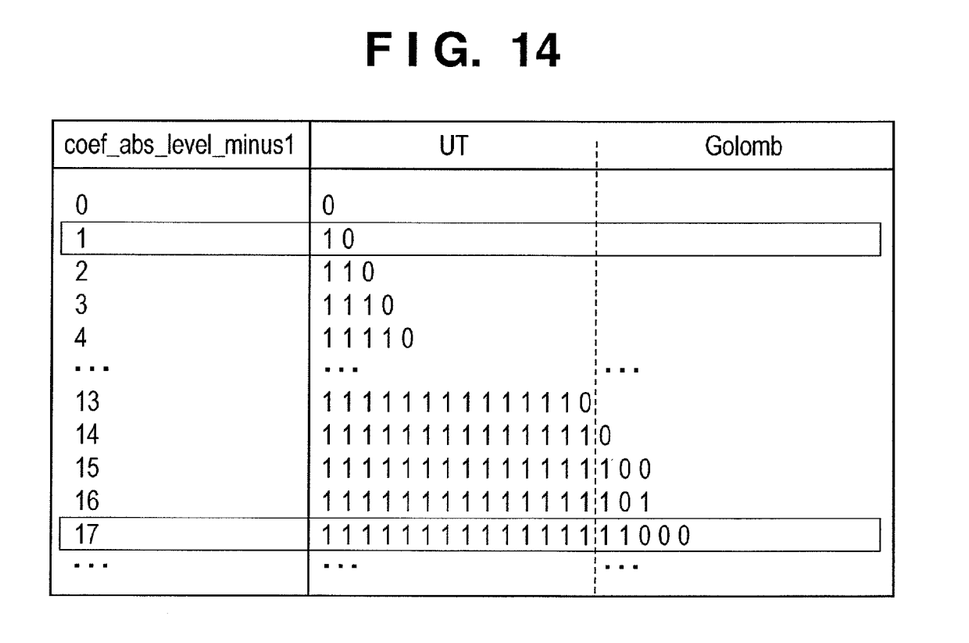
FIG. 14 is a schematic diagram illustrating an operation performed by a concatenated unary/k-th order exponential Golomb binarization unit according to an exemplary embodiment of the present invention.

In addition, FIG. 13 shows a distribution of transform coefficient values in a 4×4 block that are input to the entropy coding apparatus according to the first exemplary embodiment of the present invention. Values obtained by subtracting 1 from absolute values of the transform coefficients in the 4×4 block shown in FIG. 13 are input to the entropy coding apparatus as a syntax element (SE) coef_abs_level_minus1 in an order of inverse zigzag scan. The concatenated unary/K-th order exponential Golomb binarization unit 603 included in the binarization unit 104 performs binarization processing shown in FIG. 14 on this syntax element coef_abs_level_minus1. Since the syntax element coef_abs_level_minus1 for "−2", which is a first significant coefficient in the inverse zigzag scan order, is equal to 1, a symbol data string "01" including two symbols is generated. This operation is performed during a cycle 1 in both FIGS. 11 and 12.

Furthermore, the fixed length binarization unit 604 of the binarization unit 104 performs binarization processing on a sign of the transform coefficient value. However, since the length of an SE value synElVal for the sign is one bit and the length of a symbol data string generated by the binarization processing is also one bit, the binarization of the sign can be realized by simply outputting the most significant bit of the input SE value synElVal.

The context index generation unit 102 generates a context index corresponding to a leading symbol (binIdx0). In this case, since the value ctxIdxInc is determined to be equal to 0 (ctxIdxInc=0) on the basis of the equations and the offset of the syntax element coef_abs_level_minus1 is equal to 227 (ctxIdxOffset=227) according to the H.264 recommendation, the generated context index is equal to 227 (ctxIdx=227).

Subsequently, during cycles 3 and 4 shown in FIG. 11, the symbol selecting unit 106 sequentially outputs symbols to the normal arithmetic coding unit 108 and the bypass arithmetic coding unit 107 according to the result of categorization performed by the categorization unit 105 using the method shown in FIG. 7. By this operation, entropy coding of the first transform coefficient value "−2" is realized.

Subsequently, during a cycle 5, binarization processing is performed on a syntax element coef_abs_level_minus1 corresponding to the next transform coefficient value "18". In this case, the number of symbols generated in the binarization unit 104 is 19. When the symbol for the sign is included, the number of symbols generated in the binarization unit 104 is a total of 20 symbols.

During cycles 5 to 12, as described above, the symbol selecting unit 106 selects symbols categorized by the categorization unit 105, and outputs the selected symbols to the normal arithmetic coding unit 108 and the bypass arithmetic coding unit 107. However, this operation differs from the above-described one in two respects described below.

A first respect is a method for outputting symbols belonging to the category 1 to the normal arithmetic coding unit 108. In this operation, the symbol selecting unit 106 parallelly selects two symbols. However, since the 16th symbol (binIdx15) is the last symbol belonging to the category 1, only one symbol is selected.

A second respect is that symbols for the syntax element coef_abs_level_minus1 and a symbol for the sign (i.e., sign shown in FIG. 11) are categorized into an identical category of the category 2. Since the bypass arithmetic coding unit 107 is used for the arithmetic coding of the symbol for the sign, the symbols for syntax element coef_abs_level_minus1 and the symbol for the sign can be categorized into the identical category. Accordingly, the categorization unit 105 categorizes the syntax element coef_abs_level_minus1 and the sign into the identical category. By repeatedly performing the above-described processing for all of the syntax elements, high-speed entropy coding can be realized.

Second Exemplary Embodiment

In a second exemplary embodiment of the present invention, it is assumed that a normal arithmetic coding unit (corresponding to a first arithmetic coding unit) 108 is capable of performing arithmetic coding of a maximum of one symbol at the same time, whereas a bypass arithmetic coding unit (corresponding to a second arithmetic coding unit) 107 is capable of performing arithmetic coding of a maximum of four symbols at the same time. In the second exemplary embodiment, a configuration of an entropy coding apparatus can be realized as illustrated by the block diagram shown in FIG. 1.

Figure 15:
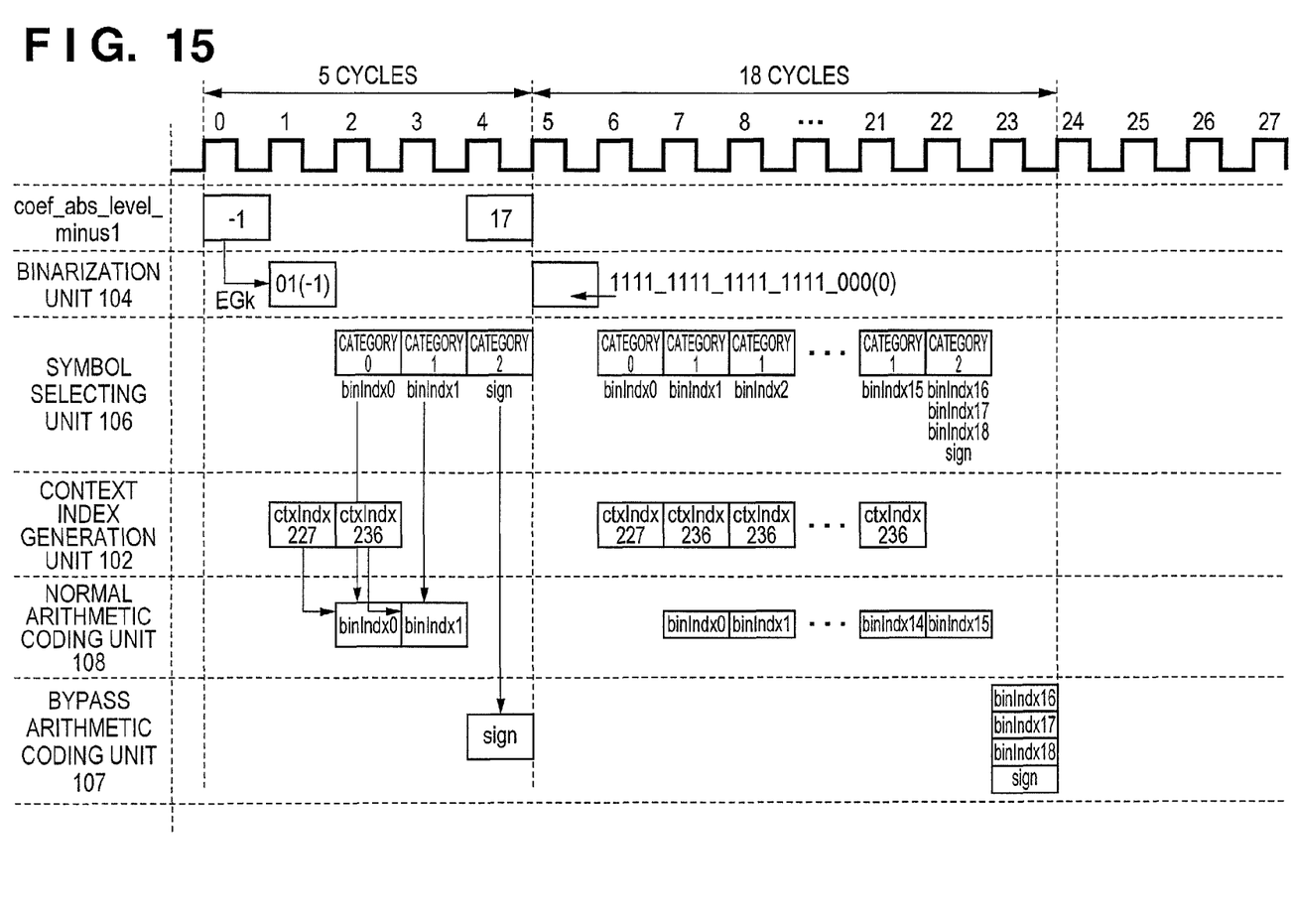
FIG. 15 is a timing chart of operations performed by an entropy coding apparatus according to a second exemplary embodiment of the present invention.

FIG. 15 shows a timing chart of operations performed by an entropy coding apparatus according to the second exemplary embodiment of the present invention. A method for selecting symbols belonging to a category 1 employed in the second exemplary embodiment differs from that employed in the first exemplary embodiment.

More specifically, in the second exemplary embodiment, a symbol selecting unit 106 sequentially selects only one symbol belonging to the category 1 per cycle, and outputs the selected symbol to the normal arithmetic coding unit 108. Other operations are similar to those of the first exemplary embodiment. The use of the second exemplary embodiment of the present invention allows the number of symbols parallelly processed by the normal arithmetic coding unit 108 or the bypass arithmetic coding unit 107 to be selected according to a semiconductor process and a operation clock frequency of an LSI (large-scale integrated circuit) implementing the entropy coding apparatus.

Third Exemplary Embodiment

Functions of entropy coding apparatuses according to the above-described first and second exemplary embodiments of the present invention can also be realized by supplying a storage medium that stores a software program for realizing the functions to a system or an apparatus, and by a computer (or a CPU (central processing unit) and an MPU (microprocessing unit)) of the system or the apparatus reading out and executing the software program stored on the storage medium. In such a case, the program read out from the storage medium realizes the functions of the entropy coding apparatuses according to the above-described exemplary embodiments. The program and a computer-readable storage medium storing the program are also included in the scope of the present invention.

For example, a flexible disk, a hard disk, an optical disk such as a CD-ROM (Compact Disk-Read Only Memory), a CD-R(Recordable), or a DVD (Digital Versatile Disk), a magneto-optical disk, a magnetic tape, non-volatile memory card, and a ROM can be used as the storage medium used for supplying the program. In addition to realization of the functions of the entropy coding apparatuses according to the above-described exemplary embodiments by executing the program read out by the computer, an operating system (OS) or the like working on the computer may perform some or all of the actual processing operations on the basis of instructions of the program, and the functions of the entropy coding apparatuses according to the above-described exemplary embodiments may be realized by the processing operations. Such a case is also included in the scope of the present invention.

Moreover, the program read out from the storage medium may be written in a memory included in a function expansion board inserted into the computer or a memory included in a function expansion unit connected to the computer. Then, on the basis of instructions of the program, a CPU or the like included in the function expansion board or the function expansion unit executes some or all of the processing operations, and the functions of the entropy coding apparatuses according to the above-described exemplary embodiments may be realized by the processing operations. Such a case is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-296500, filed on Oct. 31, 2006, which is hereby incorporated by reference herein its entirety.

The invention claimed is:

1. An entropy coding apparatus for context-based adaptive binary arithmetic coding (CABAC), comprising:

a binarization unit configured to binarize a value of an input syntax element to generate a symbol data string including at least one symbol;

a categorization unit configured to categorize each of the at least one symbol, according to a bit position of each of the at least one symbol in the symbol data string and a target arithmetic coding mode;

a symbol selecting unit configured to select at least one symbol belonging to an identical category among the symbols input from the categorization unit, output the selected at least one symbol, and specify an arithmetic coding mode to be applied to the selected at least one symbol;

an arithmetic coding section configured to parallelly perform arithmetic coding of the at least one symbol, using the arithmetic coding mode specified by the symbol selecting unit; and a context index generation unit, wherein the arithmetic coding section includes a context memory configured to hold a plurality of values representing probability states of a context model, wherein the context index generation unit generates, according to a type of the input syntax element and a result of categorization performed by the categorization unit, a context index corresponding to each symbol output from the symbol selecting unit, and wherein the context index is address information that designates an address of the context memory.

2. The entropy coding apparatus according to claim 1, wherein the arithmetic coding section includes a first arithmetic coding unit configured to perform arithmetic coding using the context model and a second arithmetic coding unit configured to perform arithmetic coding without using the context model.

3. The entropy coding apparatus according to claim 2, wherein each of the first arithmetic coding unit and the second arithmetic coding unit parallelly performs arithmetic coding of a plurality of symbols.

4. The entropy coding apparatus according to claim 2, wherein only the second arithmetic coding unit parallelly performs arithmetic coding of a plurality of symbols.

* * * * *